United States Patent
Bohler et al.

[11] Patent Number: 6,048,144
[45] Date of Patent: Apr. 11, 2000

[54] TEMPERATURE INSERTION SPINDLE

[76] Inventors: Lloyd C. Bohler, P.O. Box 70, Braham, Minn. 55006; Chris E. Bohler, 7800-Sunkist Blvd., Brooklyn Park, Minn. 55444

[21] Appl. No.: 09/261,676

[22] Filed: Mar. 3, 1999

Related U.S. Application Data

[60] Provisional application No. 60/105,675, Oct. 26, 1998.
[51] Int. Cl.$^7$ .................................................. B23Q 5/04
[52] U.S. Cl. ............................. 409/231; 29/447; 409/232
[58] Field of Search .................................. 409/234, 232, 409/231; 29/447

[56] References Cited

U.S. PATENT DOCUMENTS

| | | | |
|---|---|---|---|
| 3,678,632 | 7/1972 | Eversole et al. | 409/231 |
| 4,723,877 | 2/1988 | Erickson | 409/234 |
| 4,747,735 | 5/1988 | Erickson et al. | 409/234 |
| 5,127,780 | 7/1992 | Massa | 409/234 |
| 5,277,435 | 1/1994 | Kramer et al. | 409/234 |
| 5,280,671 | 1/1994 | Marquart | 409/234 |
| 5,311,654 | 5/1994 | Cook | 29/447 |

*Primary Examiner*—Steven C. Bishop

[57] ABSTRACT

The present invention relates to an improved spindle. The spindle uses improved shrink fit technology. This spindle is heated by means of an electric heating coil. This causes the internal diameter of the spindle bore to expand large enough to fit a toolholder that is manufactured to the predetermined size of 0.0015 per inch of diameter larger than the internal diameter of the spindle bore when both are measured at room temperature. After the toolholder is placed in the spindle a refrigerant blast cools the internal diameter of the spindle bore. This causes the spindle to grip the toolholder in an extremely rigid fashion having a desirable effect on the overall concentricity of the toolholder. The improved shrink fit technology is apparent when removing the toolholder from the spindle. The toolholder is manufactured using a predetermined type of steel with a lower thermal expansion rate than that of the internal diameter of the spindle bore. Also a refrigerant blast is directed through the toolholder as the internal diameter of the spindle bore is heated by conduction. For these reasons the toolholder is not heated by conduction at the same rate as the internal diameter of the spindle bore making for fast reliable removal of the toolholder from the spindle.

4 Claims, 4 Drawing Sheets

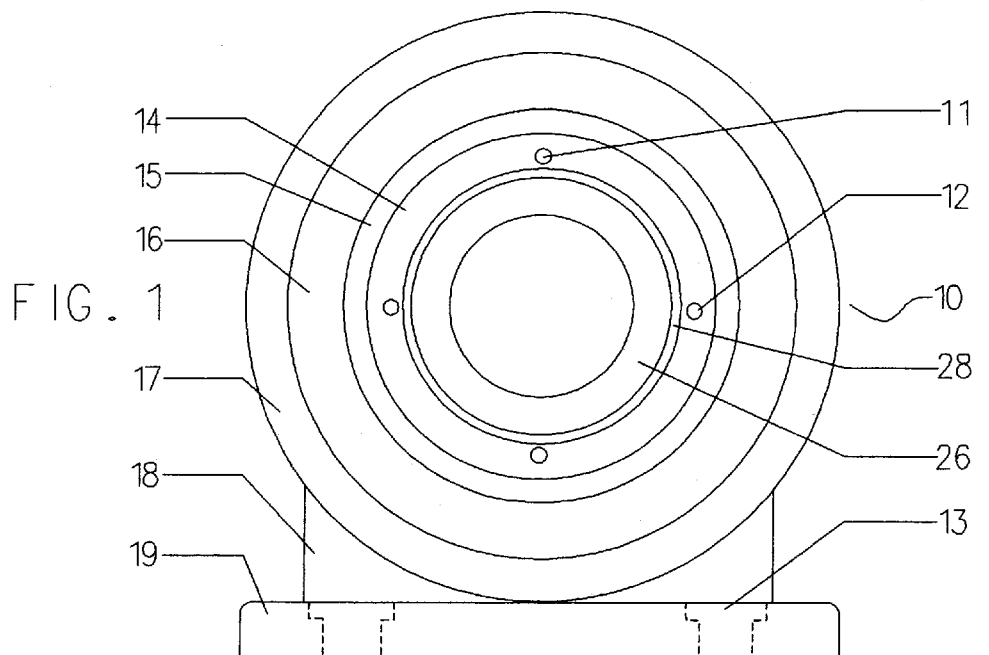
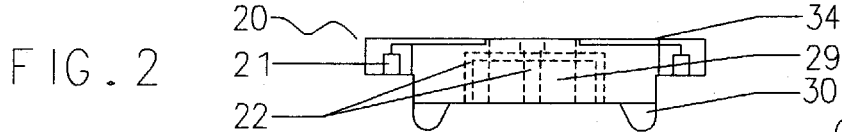
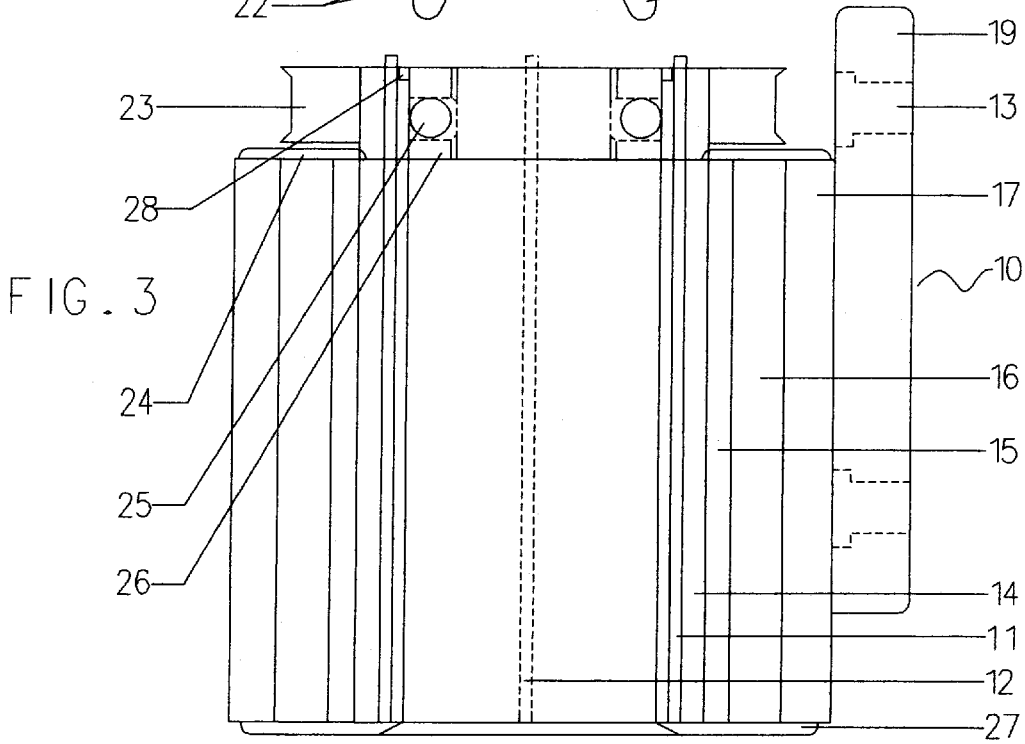

TEMPERATURE INSERTION SPINDLE

CROSS REFERENCES TO RELATED APPLICATIONS

This application claims benefit of Provisional Application #60/105,675 filing date Oct. 26, 1998.

BACKGROUND OF THE INVENTION

This invention relates to a spindle which when heated by means of an electric heating coil expands to fit a mating toolholder. The spindle is then cooled by means of a refrigerant blast and contracts to grip the toolholder having an extremely beneficial effect on the rigidity and concentricity of the toolholder. One of the problems this invention solves is working with shrink fit chucking devices, it is often difficult to remove a tool from the chuck since heating the chuck causes the tool to be heated by conduction as well. This problem is solved by a refrigerant blast through the air lines capable of receiving a refrigerant blast provided in the toolholder also the toolholder is manufactured from a predetermined type of steel with a lower thermal expansion rate than that of the internal diameter of the spindle bore.

This prevents the toolholder from being heated by conduction at the same rate as the internal diameter of the spindle bore thus making for easy removal of the said toolholder.

Another problem this invention solves is an extremely accurate spindle is needed for use in modern day machine tools which employ the use of automatic toolchanger arms. Also an extremely accurate spindle is needed anywhere high-speed machining is prevalent. New and improved spindles for high-speed machining are always needed in the automotive and aerospace industries. Although the related prior art Erickson et al. U.S. Pat. No. 4,747,735; Erickson U.S. Pat. No. 4,723,877; Massa U.S. Pat. No. 5,127,780 have good accuracy and work holding capabilities they are toolholders. One problem with toolholders is they are used in conventional spindles which do not employ shrink fit technology therefore they have limited rigidity and concentricity capabilities. These toolholders are extended out from the spindle which can often magnify the poor rigidity and concentricity of the spindle being used to hold these toolholders.

Various types of spindles are known for locating tools in a rigid manner. The Kramer et al. U.S. Pat. No. 5,277,435 holds a tool that is shrink fit into a spindle.

Some of the problems with this are the tool that goes into the spindle is not symmetric making concentricity and rigidity suspect where high-speed machining applications are concerned also it can not be adapted to fit a machine tool with an automatic tool changer arm and no mention is made of this in the specification and claims of the said patent.

The Marquart U.S. Pat. No. 5,280,671 shows a collet chuck that employs shrink fit technology. Some of the problems with this invention are the use of a collet chuck for a clamping device that is fastened to the spindle by a clamping apparatus, which makes for suspect rigidity and concentricity. Another significant drawback is that it can be difficult to remove the tool from the chuck since heating the chuck causes the tool to be heated by conduction as well. Moreover relatively high temperatures are needed in order to effect sufficient expansion of the chuck to remove the tool. Also the said invention can not be adapted to fit a machine tool with an automatic toolchanger arm efficiently because there is no way of cooling the tool to be removed and no mention is made of this in the specification or claims of the said invention.

BRIEF SUMMARY OF THE INVENTION

This invention is a spindle that clamps a toolholder using improved shrink fit technology. This spindle is heated by means of an electric heating coil causing the internal diameter of the spindle bore to expand a predetermined amount thereby allowing the spindle to receive a mating toolholder. The spindle is then cooled by means of a refrigerant blast causing the spindle to cool rapidly and contract to grip the toolholder in an extremely rigid manner thus having a beneficial effect on the concentricity of the toolholder placed in the spindle as well. To remove the toolholder the spindle is once again heated. This time as the spindle is heated a refrigerant blast cools the inside of the toolholder. The toolholder is manufactured out of a predetermined steel with a lower thermal expansion rate than the internal diameter of the spindle bore. In this way the heat the toolholder receives from thermal conduction is dissipated making for a fast reliable removal of the toolholder from the spindle.

The object of this invention is to improve upon the prior art of shrink fit technology. The need for high concentricity and extreme rigidity is apparent. However the need for fast reliable toolholder changes becomes apparent when using a shrink fit spindle with a modern day machining work center.

Most toolholder changes are completed in less than three seconds with the use of an automatic toolchanger arm. One advantage of this invention over the prior art is the aforementioned refrigerant blast through the toolholder. Also the toolholder is manufactured from a predetermined type of steel with a lower thermal expansion rate than the internal diameter of the spindle bore. This makes the toolholder change process faster and more reliable than the prior art cited. This is one reason this invention is unobvious and could not have been anticipated by the prior art cited.

BRIEF DESCRIPTION OF THE SEVERAL VIEWS OF THE DRAWINGS

The invention will be explained in further detail following this brief figure description.

FIG. 1 shows a front view of the spindle. This is the preferred embodiment of the aforementioned invention.

FIG. 2 shows a side view of an apparatus that serves as a toolholder lock and orientation device. This apparatus also serves as an electrical plug in and contains air lines capable of receiving a refrigerant blast. This apparatus is indicated generally by the numeral 20.

FIG. 3 shows a side view of the spindle in accordance with the present invention.

DETAILED DESCRIPTION OF THE INVENTION

Figure 4:
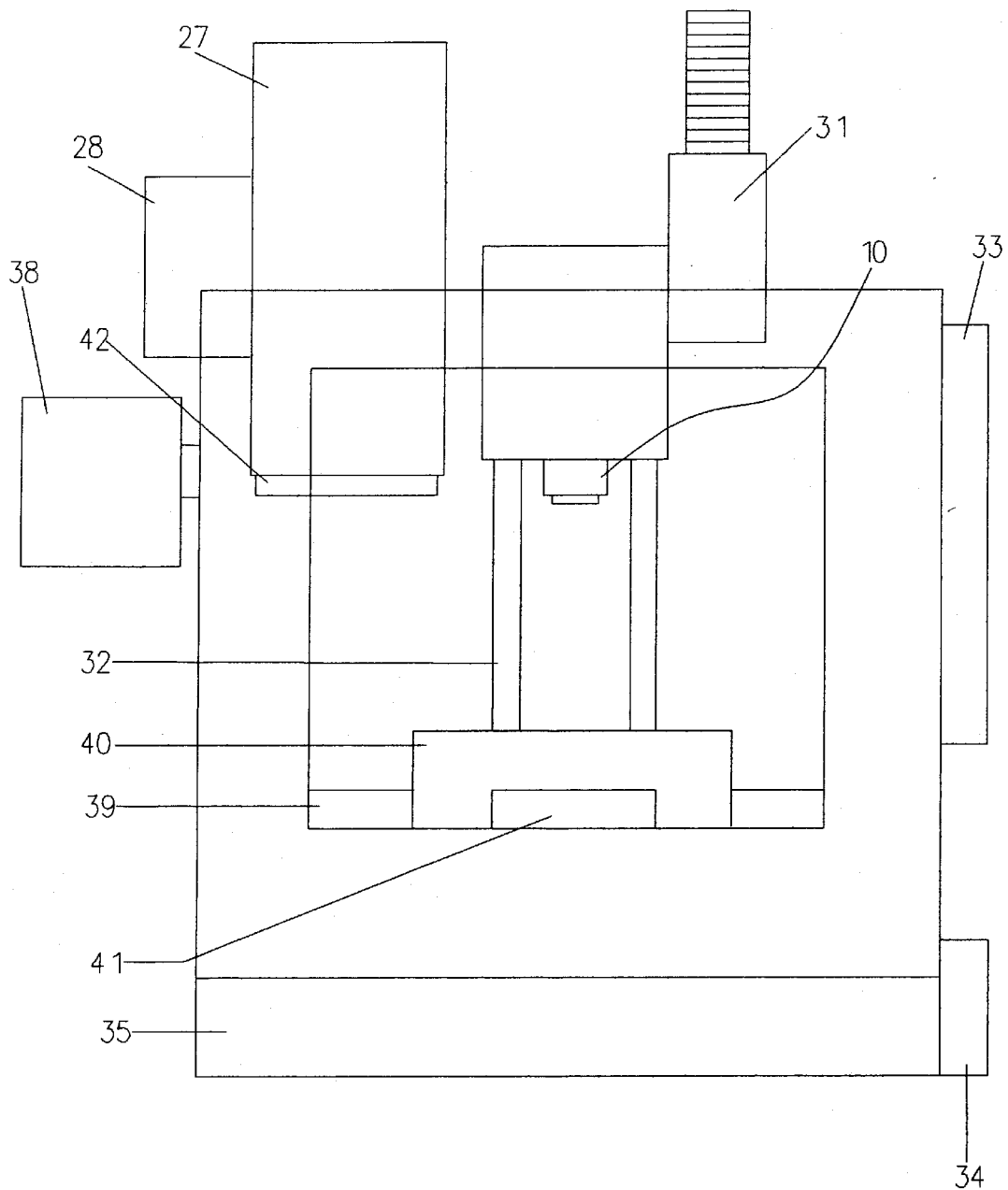
FIG. 4 shows a front view of a machining work center that is prior art. This is one application for the preferred embodiment of this invention.

Referring now to FIG. 1, a preferred embodiment of the present invention the spindle is shown therein and indicated generally by the numeral 10. The invention contains a spindle shaft 14 that is cylindrical in shape and is manufactured out of a predetermined type of tool steel. The spindle shaft 14 is precision ground to a predetermined concentricity measurement of 0.000025 or better.

The internal diameter of 14 is manufactured to the predetermined diameter of 0.0015 per inch smaller than the predetermined outer diameter of the mating toolholder 50 with the size of both 14 and 50 measured at room temperature.

Holes are provided in 14 to insert an electric heating coil 11. The heating coil 11 is the means of causing thermal expansion to occur. Thermal expansion causes the internal diameter of the spindle bore 14 to expand large enough to receive the mating toolholder 50.

Holes are also provided in 14 to serve as air lines capable of receiving a refrigerant blast 12. The air lines capable of receiving a refrigerant blast 12 are the means of causing the internal diameter of the spindle bore 14 to cool down after the mating toolholder 50 is in place. This causes a friction fit between the internal diameter of the spindle bore 14 and the mating toolholder 50.

There is a space provided in 14 to fasten a conventional temperature sensor 28 to provide a means of monitoring the temperature of the internal diameter of the spindle bore 14. The conventional temperature sensor 28 is beneficial in preventing over heating of the internal diameter of the spindle bore 14.

There is a space provided to fasten a ball bearing safety lock race 26 in place. The ball bearing safety lock race 26 is cylindrical in shape and with the use of a ball drill has two holes drilled in it that are 180 degrees across from one another. As shown in FIG. 3 two chrome balls 25 are inserted in the ball drilled holes. When the ball bearing safety lock race 26 is fully engaged it holds the mating toolholder 50 securely in place.

The spindle shaft 14 is then inserted into a ceramic-coated bearing sleeve 15. The bearing sleeve 15 is cylindrical in shape and conventional in style with an exception being the ceramic coating on its surface. The ceramic coating is beneficial because it dissipates heat and thus helps prevent the bearings from expanding when thermal expansion occurs in the internal diameter of the spindle shaft 14. This helps to reduce wearing out of the bearings and prevents possible seizure of the bearings because of high operating temperatures.

The spindle shaft 14 and the ceramic-coated bearing sleeve 15 are then together inserted into another bearing sleeve 16. Bearing sleeve 16 is cylindrical in shape and conventional in style.

The bearing sleeve 16 is then together with the ceramic-coated bearing sleeve 15 and the spindle shaft 14 encased inside the spindle housing 17. The spindle housing 17 is cylindrical in shape and manufactured out of a predetermined type of steel. The spindle housing 17 serves as the means of encasing some of the components of the spindle 10.

The spindle housing 17 is then fastened to the spindle support frame 18. This is done preferably by the means of welding. The spindle support frame 18 is as long as the spindle housing 17 and has a concave radius that is manufactured to a predetermined size and is large enough to support the spindle housing 17. The bottom of the spindle support frame 18 is then precision ground to ensure flatness.

The spindle support frame 18 is then fastened to the spindle base 19 this is done preferably by the means of welding. The spindle base 19 is then precision ground to ensure flatness. The spindle base 19 is manufactured out of a predetermined type of steel and is rectangular in shape having four drilled and counter bored holes 13 in which cap screws may be used to fasten the spindle 10 to an axis of a machine tool.

As shown in FIG. 2 a side view of an apparatus that is round and symmetrical in shape that is indicated generally by the numeral 20 and is manufactured out of steel. The apparatus 20 serves several functions. A space is provided in 20 for insulated wiring and an electrical plug 21. The electrical plug 21 is female in design and plugs onto the electric heating coil 11. This provides a means for an electrical connection from the power supply shown in FIG. 5 to the spindle 10.

A space is provided in 20 to fasten an air line adapter 22. The air line adapter 22 is capable of receiving a refrigerant blast. When 20 is fully engaged with 10 the air line adapter 22 fits over the air lines capable of receiving a refrigerant blast 12 in the spindle 10. The air line adapter 22 also lines up with the air lines capable of receiving a refrigerant blast 49 provided in the toolholder 50. This provides a means for cooling the internal diameter of the spindle shaft 14 after the toolholder 50 has been placed in the spindle 10 causing a fast friction fit between the internal diameter of the spindle bore 14 and the toolholder 50. This also provides a means for cooling the toolholder 50 preventing it from thermal expansion along with the internal diameter of the spindle bore 14 when the toolholder 50 is removed from the internal diameter of the spindle bore 14.

A space is provided in 20 for insulated electrical wiring 34. When 20 is fully engaged with the spindle 10 the insulated electrical wiring 34 makes a connection with the conventional temperature sensor 28.

A drilled and threaded hole 29 is machined through the center of 20. This drilled and threaded hole 20 is designed to fit a special retention knob 44. This special retention knob 44 has a conventional mechanical use in that it can be used in a machining work center as a pullstud. This special retention knob 44 serves as the means to engage and disengage 20 from the spindle 10. The machining work center is shown in FIG. 4 as prior art.

Two spindle lock and orientation tabs 30 are provided on 20. The spindle lock and orientation tabs 30 are 180 degrees across from one another and have a radius on the end of each one. The radius is designed to fit between the inside edge of the ball bearing safety lock race 26 and the chrome balls 25. When 20 is engaged with the spindle 10 the spindle lock and orientation tabs 30 cause the chrome balls 25 to press against the outside diameter of the profile 51 on the back portion of the toolholder 50 when it is in the spindle 10 creating a unique safety lock. The spindle lock and orientation tabs 30 also orientates the spindle 10 by locking it at 0 or 180 degrees every time 20 is engaged with the spindle 10.

FIG. 3 shows a side view of the spindle 10. Most of the components in this view have been previously described when FIG. 1 was mentioned.

A conventional pulley 23 is fastened to the spindle shaft 14. The conventional pulley 23 is belt driven by the spindle motor 31 of the machining work center FIG. 4 this provides a means of rotating the spindle shaft 14. The belt and the pulley on the spindle motor 31 are (not shown). The bearing retainer sleeve 24 consists of two symmetric half round pieces of steel that are machined flat. When the spindle 10 is being assembled each symmetric half of the bearing retainer sleeve 24 is fastened to the back of the spindle housing 17. The bearing retainer sleeve 24 is used to keep the spindle shaft 14 from moving forward or back within the spindle housing 17. Thereby holding the spindle shaft 14 and the ceramic-coated bearing sleeve 15 along with the bearing sleeve 16 in place but still allowing for movement in a rotational direction.

As previously mentioned when describing 20 the two chrome balls 25 are placed in the ball bearing safety lock race 26. The two chrome balls 25 are conventional in style. As previously described they are used to lock the toolholder 50 in the spindle shaft 14.

The spindle face plate 27 is manufactured from steel and is machined flat. The spindle face plate 27 is then fastened to the front of the spindle housing 17. A preferred way of fastening the spindle face plate 27 to the spindle housing 17 is with the use of flat head screws.

As shown in FIG. 4 a machining work center is prior art. This view shows one preferred application for the main embodiment the spindle 10. A machine tool is made up of many components only a few of the basic components are shown to help illustrate one practical use for the spindle 10.

The machining work center FIG. 4. has a spindle motor 31 this is used to rotate the spindle 10 in a clockwise or counter-clockwise direction. The spindle 10 is used to hold onto a toolholder for machining purposes.

An automatic tool changer magazine 27 rotates to the necessary toolholder stored in the automatic tool changer drum 28 until the desired toolholder is in the proper location. When the toolholder is in the proper location the automatic tool changer arm 42 can perform a tool change. The operator control panel 38 is used to control the functions of the machining work center. The computer numerical control center 33 is used to control all of the necessary functions for the desired operation. The machining surface 40 is used to hold the work piece to be machined.

The Z axis 32 allows the spindle 10 to be moved in an up or down direction. The X axis 39 allows the machining surface 40 to be moved in a left or right direction. The Y axis 41 allows the machining surface 40 to be moved in a forward or back direction. The coolant tank 35 stores the cutting fluid. The coolant pump 34 pumps the cutting fluid up to be directed onto the cutting tool and the work piece.

Figure 5:
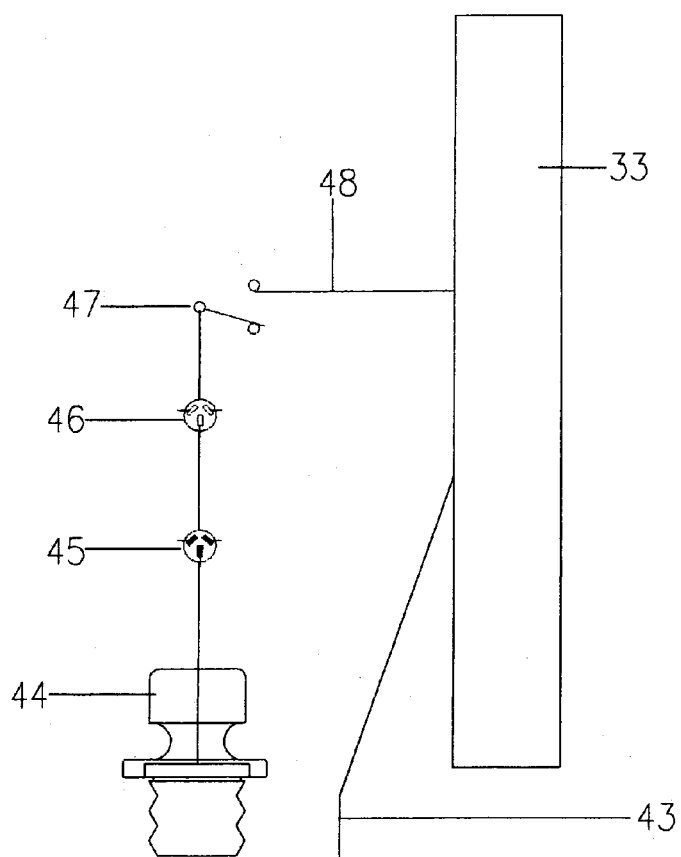
FIG. 5 shows a basic electrical schematic as well as a special retention knob that also serves as an electrical plug.

Referring now to FIG. 5 a basic electrical schematic as well as a special retention knob 44 that also serves as an electrical plug. A computer numerical control center prior art 33 uses a 208 volt power supply and is used to control all of the necessary functions for the desired operation. Conventional electrical wiring 48 is routed from a conventional circuit breaker 47 to the computer numerical control center prior art 33. A conventional female three prong electrical plug 46 is routed from the circuit breaker 47 to the conventional male three prong electrical plug 45. The conventional male three prong electrical plug 45 is routed to the special retention knob 44. A space is provided in the special retention knob 44 for conventional electrical wiring. This is necessary to make a complete circuit between the computer numerical control center prior art 33 and apparatus 20.

Conventional electrical wiring 43 is routed from the computer numerical control center prior art to the electrical wiring 34 provided in apparatus 20.

Figure 6:
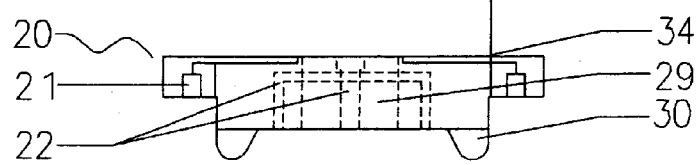
FIG. 6 shows a side view of 20.

Referring now to FIG. 6 a view of the components shown in FIG. 2. Although the components in this view have been previously described the relationship to FIG. 5 the basic electrical schematic and special retention knob 44 becomes clearer as viewed in FIG. 6.

A drilled and threaded hole 29 is provided in 20 large enough for the special retention knob 44 to be threaded into. After the special retention knob 44 is threaded in place the insulated electrical wiring provided in the special retention knob 44 makes contact with the insulated electrical wiring and electrical plug 21 provided in apparatus 20. This completes the electrical circuit between the computer numerical control center prior art 33 and apparatus 20.

Figure 7:
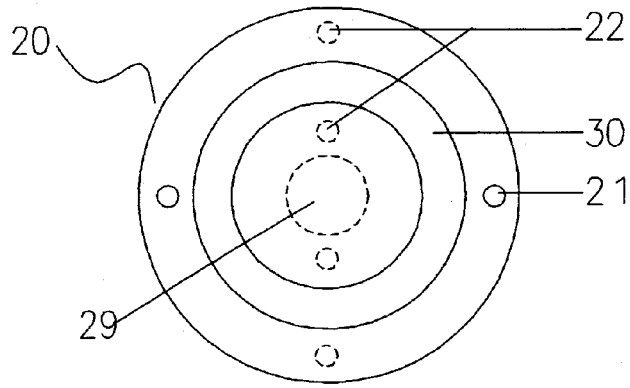
FIG. 7 shows a bottom view of 20 as they relate to the basic electrical schematic.

Referring now to FIG. 7 a bottom view of apparatus 20. The components in this view are as previously described. This view is only intended to show the components more completely.

Figure 8:
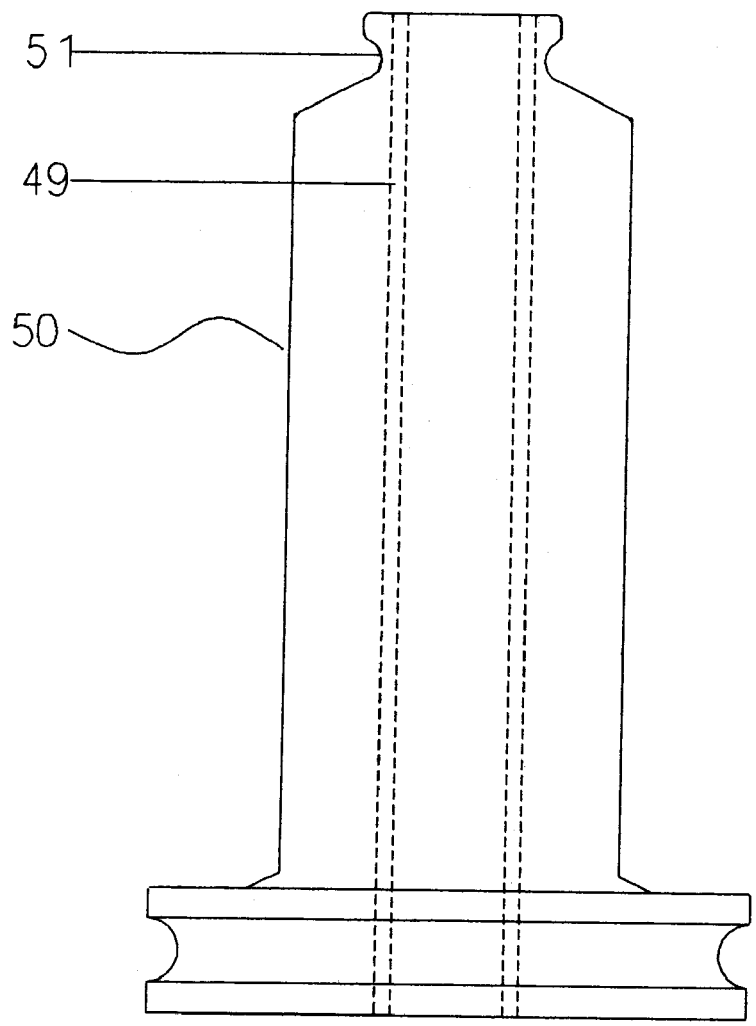
FIG. 8 shows a front view of a symmetrical toolholder that can be locked in the spindle. This toolholder has air lines that are capable of receiving a refrigerant blast.

As shown in FIG. 8 a toolholder 50 manufactured from a predetermined type of steel with a lower thermal expansion rate than that of the internal diameter of the spindle bore 14.

This is beneficial so the toolholder 50 does not expand as much as the internal diameter of the spindle 14 when thermal conduction occurs. The outer diameter of the toolholder 50 is manufactured to the predetermined size of 0.0015 per inch of diameter larger than the internal diameter of the spindle bore 14. This is necessary to produce the friction fit between the toolholder 50 and the internal diameter of the spindle bore 14. Holes are provided in the toolholder 50 for air lines capable of receiving a refrigerant blast 49. This helps to dissipate heat in the toolholder 50 when thermal conduction occurs in the internal diameter of the spindle bore 14 thus making for a fast reliable removal of the toolholder 50. As previously described the outside diameter of the profile 51 on the back portion of the toolholder 50 is used as a unique safety lock and holds the toolholder 50 in the spindle 10.

What is claimed is:

1. A machine tool spindle, comprising:
    a spindle shaft;
    an opening in said spindle shaft for receiving a toolholder;
    a heating coil within said spindle shaft for heating said spindle shaft and expanding said opening to freely receive a toolholder;
    at least one refrigerant passage within said spindle shaft for receiving refrigerant for cooling said spindle shaft and contracting said opening, thereby gripping a toolholder received therein.

2. The machine tool spindle of claim 1, in combination with a toolholder.

3. The combination of claim 2, wherein said tool holder includes at least one refrigerant passage for receiving refrigerant.

4. The machine tool spindle of claim 1, further comprising;
    an adapter, said adapter including electrical connection means for connecting said heating coil to an outside power supply, and refrigerant connection means for connecting a refrigerant supply to said at least one refrigerant passage in said spindle shaft.

\* \* \* \* \*